United States Patent [19]

Sohmuta

[11] Patent Number: 5,469,422

[45] Date of Patent: Nov. 21, 1995

[54] WRITING AND ERASING INFORMATION BY VARYING THE TEMPERATURE OF AN OPTICAL RECORDING MEDIUM

[75] Inventor: Mitoshi Sohmuta, Tokyo, Japan

[73] Assignee: NEC Corporation, Japan

[21] Appl. No.: 183,147

[22] Filed: Jan. 19, 1994

[30] Foreign Application Priority Data

Jan. 18, 1993 [JP] Japan .................................. 5-005464

[51] Int. Cl.⁶ ........................................................ G11B 7/00
[52] U.S. Cl. .............................. 369/100; 369/13; 369/116; 369/59
[58] Field of Search .............................. 369/116, 13, 54, 369/100, 58, 59, 288

[56] References Cited

U.S. PATENT DOCUMENTS

| 4,718,053 | 1/1988 | Sato et al. ............................... 369/100 |
| 4,839,861 | 6/1989 | Ikegawa et al. ........................ 369/100 |
| 5,276,670 | 1/1994 | Nogami et al. ......................... 369/116 |
| 5,289,453 | 2/1994 | Ohno et al. ............................. 369/116 |
| 5,321,672 | 6/1994 | Miyamoto et al. ...................... 369/13 |
| 5,353,270 | 10/1994 | Iimura ..................................... 369/116 |
| 5,381,396 | 1/1995 | Tanaka et al. .......................... 369/116 |

FOREIGN PATENT DOCUMENTS

| 63-214922 | 9/1988 | Japan . |
| 2239429 | 9/1990 | Japan . |

OTHER PUBLICATIONS

Patent Disclosure Gazettes of No. 1989–43816 and No. 1989–59633.

*Primary Examiner*—Georgia Y. Epps
*Assistant Examiner*—Kim-Kwok Chu
*Attorney, Agent, or Firm*—Laff, Whitesel, Conte & Saret, Ltd.

[57] ABSTRACT

Irradiation of the optical disk medium is pulsized to achieve reading, erasing and recording with binarized read power and write power; setting of erase power is dispensed with to shorten the process required to adjust the optical head; and the shapes of pits formed on the optical disk medium are optimized by varying the switching time between the write power and the read power to improve the CNR of read signals and the jitter characteristic.

Division is accomplished by a logical circuit into an area A in which a variation from the erase temperature to the write temperature is to take place, area B in which the write temperature is to be kept constant, area C in which a variation from the write temperature to the erase temperature is to take place, and area D in which the erase temperature is to be kept constant to generate, from data to be recorded and a clock pulse having a frequency equal to an integral multiple of the bit clock thereof, a recording signal representing the timing of laser irradiation.

This recording signal is supplied to a pulse current drive circuit to be converted into a pulse current for varying the laster irradiation power alternately between read power and write power, and the pulse current, to which a biasing direct current corresponding to the read power is added, is supplied to a laser diode.

4 Claims, 5 Drawing Sheets

WRITING AND ERASING INFORMATION BY VARYING THE TEMPERATURE OF AN OPTICAL RECORDING MEDIUM

BACKGROUND OF THE INVENTION

The present invention relates to a method and an apparatus for recording on optical disk media which are used for recording data processed by a computer or the like, recording audio or audio-visual signals, or recording and reproducing other information.

Along with the advancement of computers and of means for fast and massive transmission of information in recent invention, requirements have arisen for the development of nonvolatile memory apparatuses which are inexpensive but have high density and large capacity and excelling in capability to transfer information at high speed.

Apparatus having magnetic disk media as such nonvolatile memory units are generally used, but they in fact have the disadvantages of being inadequate in recording capacity and expensive per unit of information and, particularly, not permitting the interchange of recording media in a fixed type magnetic disk apparatus.

In this connection, technology for optically recording information on media is attracting keen interest as a solution to these problems and, especially, users in many different areas are pinning much hope on rewritable optical disk media and memory apparatuses using such media.

Usually, such an optical recording apparatus according to the prior art consists of a pulse current drive circuit, a bias current drive circuit for erasing use, a bias current drive circuit for reading use, an adder, and an optical head having a laser diode.

The pulse current drive circuit is so configured as to receive from outside original signals representing data to be recorded on an optical disk medium and to supply the adder with an output current according to the values of these original signals.

The bias current drive circuits for erasing use and that for reading use are so configured as to supply the adder with output currents when having respectively received switching signals.

In this prior art optical recording apparatus, a switching signal is supplied to the reading bias current drive circuit at the time of reading; the laser diode of the optical head is driven only by this output current of the reading bias current drive circuit; at the time of writing or erasing, a switching signal is supplied to the erasing bias current drive circuit; an output current corresponding to an original signal from the pulse current drive circuit and an output current from the erasing bias current drive circuit are supplied to the adder; and the laser diode of the optical is driven according to this added current value.

The pulse current drive circuit supplies a current by pulse drive as the potential of the original signal takes on a high level state or a low level state.

Moreover, the method of recording by this prior ark optical recording apparatus uses the laser irradiation power deriving from the Laser drive current at three separate steps including read power, erase power and write power, differentiated by the original signals and the switching signal.

By irradiating the recording layer of the optical disk medium with the laser beam, the medium temperature of the recording part is varied to the write temperature or the erase temperature to form pits corresponding to the pulse lengths of the original signals on the optical disk medium.

The optical recording apparatus and method according to the prior art, however, involves the following problem (see FIG. 5).

Thus, since the duration of irradiation with the laser beam is determined by the pulse length of the original signal, the medium temperature of a recording part corresponding to an original signal of a smaller pulse length does not become sufficiently high relative to that of a recording part corresponding to an original signal of a greater pulse length, resulting in an ultimate temperature difference on the recording layer of the optical disk medium between original signals of smaller pulse lengths and original signals of greater pulse lengths.

As a result, the time ($\Delta t2$) taken to vary the medium temperature at an original signal of a greater pulse length from the write temperature to the erase temperature becomes longer than the time ($\Delta t1$) taken to vary the medium temperature at an original signal of a smaller pulse length from the write temperature to the erase temperature, entailing a time lag.

Thus, the shapes of pits formed on the recording layer of the optical disk medium become uneven, leading to the problem of inviting deteriorations in carrier-to-noise ratio (CNR) and in jitter characteristic at the time of reading.

Furthermore, the use of the laser irradiation power deriving from the laser drive current at three separate steps including read power, erasing power and write power, differentiated by switching signals, leads to the problems that the procedure of adjustment an the time of setting the irradiation power of the laser beach from the optical head is made complex, and that the process required to adjust that irradiation power is increased.

Hereupon, it may be relevant to other examples of optical recording method according to the prior art and their problems.

According to examples disclosed in the Patent Disclosure Gazettes of No. 1989-43816 and No. 1989-59633, when information is to be recorded on an optical disk medium, the temperature of the recording part is controlled by varying the laser irradiation power.

However, since the laser irradiation power at the time of writing is varied when .information is to be recorded according to the methods of both these reference, there is the problem that multi-value laser irradiation power is required, entailing difficulty in temperature control besides the complex configuration of the current drive circuit for the laser diode.

On the other hand, according to examples disclosed in the Patent Disclosure Gazettes of No. 1988-214922 and No. 1990-239429, when information is to be recorded on an optical disk medium, the larger irradiation power is pulsized for the recording purpose.

However, by the method of the former reference, as temperature control is imprecise, there occurs the phenomenon that the temperature of the recording part varies with the width of the recording signal and the region of recording pit extension accordingly varies, making it impossible to accurately generate recording pits on the optical disk medium and to correctly recognize information on the pit edge.

On the other hand, according to the latter, although a long pulse is used for laser irradiation to achieve temperature control at the beginning of recording, there is the problem that the recording pit becomes greater than the signal to be actually recorded because the laser beam diameter and the extension of heat along with the temperature rise are not sufficiently taken into account. There is another problem that, unless the laser irradiation power is reduced, the magnitude of the signal to be recorded becomes unidentical with that of the recorded pit in which the signal is actually recorded, resulting in a deteriorated CNR. Furthermore, because of the lack of synchronism between the output of a signal generator for generating short pulses and the recording signal, the jitter characteristic is also deteriorated.

SUMMARY OF THE INVENTION

An object of the present invention is to solve the above-described problems, realize overwrite recording, i.e. simultaneous writing and erasing by irradiation with a laser beam, and provide a method and an apparatus for recording on optical disk media which require no multi-value laser irradiation power and facilitate simplification of the laser diode drive circuit and temperature control of the recording part by varying the pulse time of laser irradiation instead of varying the laser irradiation power itself between the time of writing and that of erasing.

According to the method of this invention for recording on optical disk media, by which writing and erasing are accomplished correspondingly to the data to be recorded by varying the temperature of the recording part on the recording layer of an optical disk medium to predetermined write and erase temperatures by lager irradiation, the process of varying the temperature of said recording part of the optical disk medium to said write temperature and said erase temperature correspondingly to the data to be recorded on or to be erased from Laid optical disk medium is divided into an area in which a variation from said erase temperature to said write temperature is to take place, an area in which said write temperature is to be kept constant, an area in which a variation from said write temperature to said erase temperature is to take place, and an area in which said erase temperature is to be kept constant, and data are recorded and erased by irradiating each area at a prescribed timing in a pulse means with a laser beam consisting of write power for writing data on said optical disk medium and read power for reading data from said Optical disk medium.

The apparatus according to the invention for recording on optical disk media, by which writing and erasing are accomplished correspondingly to the data to be recorded by varying the temperature of the recording part on the recording layer of an optical disk medium to predetermined write and erase temperatures by laser irradiation is provided with a logical circuit for converting the data to be recorded and a clock pulse having a frequency equal to an integral multiple of the bit clock of the data into a prescribed recording signal; a current drive circuit for generating and supplying a pulse current corresponding to said recording signal .supplied from said logical circuit; a bias current drive circuit for generating and supplying a biasing direct current corresponding to the laser irradiation power at the time of reading; and means for driving a laser diode to perform laser irradiation derived from said pulse current and said direct current, and irradiating said recording part of the optical disk medium with a laser beam.

BRIEF DESCRIPTION OF THE DRAWINGS

The features and advantages of the present invention will become apparent from the following detailed description when taken in conjunction with the accompanying drawings, in which.

DETAILED DESCRIPTION OF THE PREFERRED EMBODIMENTS

Next will be described in detail preferred embodiments of the present invention with reference to drawings.

First will be described an embodiment of the method of recording on optical disk media according to the invention with reference to FIG. 1.

Figure 1:
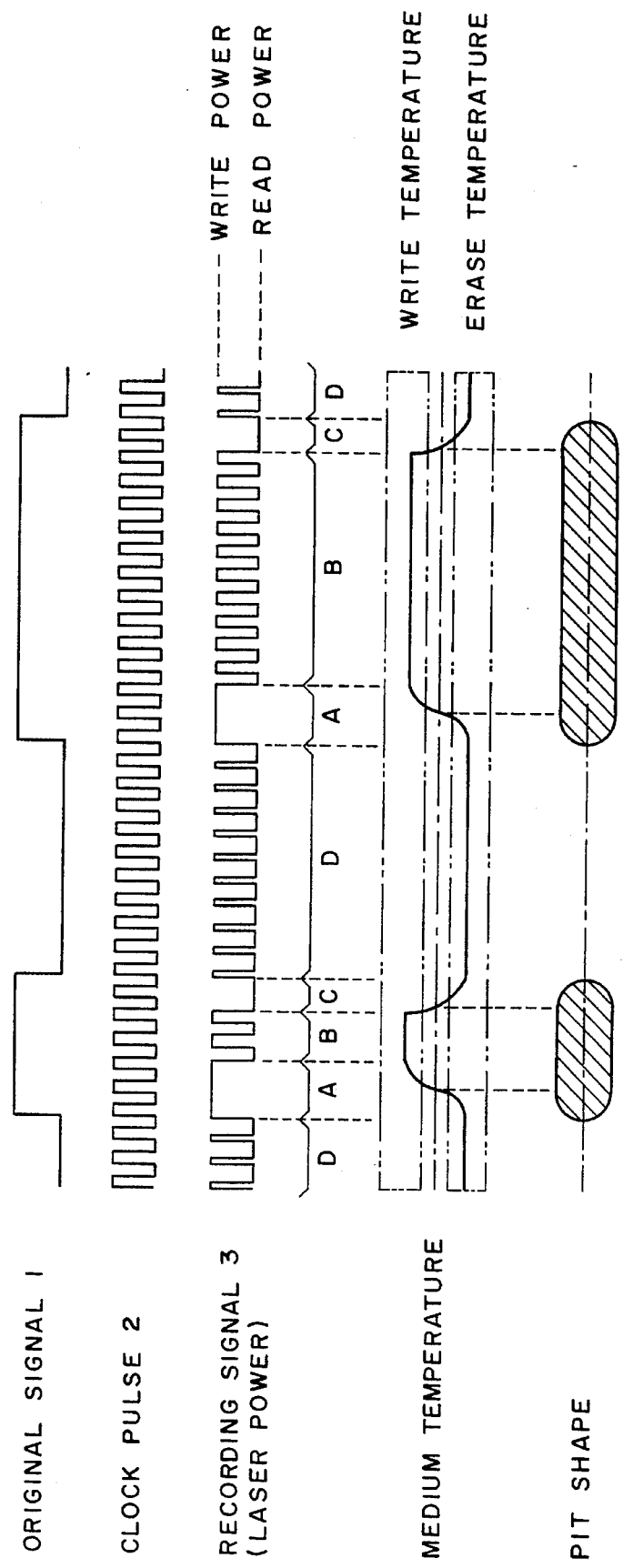
FIG. 1 is an illustrative diagram of a preferred embodiment of the method of recording on optical disk media according to the invention.

As illustrated in FIG. 1, a recording signal 3 corresponding to laser irradiation power, generated from an original signal 1 representing data to be recorded and an externally supplied clock pulse signal 2, is divided into area A in which a steep rise from the erase temperature to the write temperature is to be achieved, area B in which the write temperature is to be kept constant, area C in which a steep fall from the write temperature to the erase temperature is to be achieved, and area D in which the erase temperature is to be kept constant.

The medium temperature in the recording part can be readily controlled by irradiating the recording layer of the optical disk medium with a laser beam correspondingly to this recording signal 3, and it is thereby made possible to bring the pit formed on the recording layer of the optical disk medium close to its ideal shape.

Here in the area in which the original signal 1 varies from a low level state to a high level state, i.e. area A, the irradiation power of the laser beam is kept at the write power when the recording layer of the medium is irradiated with it to raise the medium temperature steeply from the erase to the write temperature.

Similarly in the area in which the original signal 1 varies from the high level state to the low level state, i.e. area C, the irradiation power of the laser beam is kept at the read power when the recording layer of the medium is irradiated with it to bring down the medium temperature steeply from the write to the erase temperature.

In the area in which the original signal 1 maintains the high level state, i.e. in area B, the irradiation power of the laser beam is switched to the write power and the read power when the recording layer of the medium is irradiated with it in a pulse means to keep the medium temperature constant at the write temperature.

Further in the area in which the original signal 1 maintains the low level state, i.e. in area D, the irradiation power of the lapser beam is switched to the write power and the read power when the recording layer of the medium is irradiated with it in a pulse means to keep the medium temperature constant a% the erase temperature.

Thus by dividing the process of laser irradiation into an area in which the medium temperature is to be varied from the erase temperature to the write temperature, an area in which the write temperature is to be kept constant, an area in which the medium temperature is to be varied from the write temperature to the erase temperature, and an area in which the erase temperature is to be kept constant, and by irradiating the recording layer of the optical disk medium with a laser beam while finely switching it between the write power and the read power correspondingly to each area, the erase power, which is an intermediate value between the write power and the read power, is made dispensable, with the result that the adjustment procedure for the optical head can be simplified and the process required to adjust the optical head can be shortened.

Moreover, as it is possible to quickly vary the medium temperature, the shapes of pits formed on the recording layer of the medium are uniformized, and the areas in which the boundaries between pits are blurred are decreased, resulting in a higher CNR.

Furthermore, since the write temperature or the read temperature is maintained until the varying point of the medium temperature without being affected by the pulse width of the original signal, the medium temperature can be raised from the erase to the write temperature or reduced from the write to the erase temperature always in an equal length of time. As a result, pits corresponding to the pulses of the original signals can be accurately formed on the recording layer of the medium, and the jitter characteristic at the time of reading can be improved correspondingly.

Next will be described an apparatus for recording on optical disk media, which is a preferred embodiment of the present invention, with reference to FIG. 2.

The apparatus for recording on optical disk media according to the invention is provided with a phase locked loop (PLL) circuit 4, a logical circuit 5, a pulse current drive circuit 6, an adder 7, an optical head 9 having a laser diode 8, and a bias current drive circuit 10, and so configured that an original signal i and a clock pulse signal 2 be supplied to the logical circuit 5.

Here, in order to have the logical circuit 5 generate from the original signal 1 a recording signal 3 representing the timing of irradiation with a laser beam, the clock pulse signal 2 having a frequency equal to an integral multiple of a bit clock synchronized with the original signal 1 is needed. In the absence of this clock pulse signal 2, a signal equivalent to the clock pulse signal 2 is generated from the original signal 1 by the PLL circuit 4 and supplied to the logical circuit 5.

The bias current drive circuit 10 generates, and supplies the adder 7 with, a direct current corresponding to the laser irradiation power at the time of reading (read power).

The pulse current drive circuit 6 intermittently generates a current corresponding to the difference between the write power and the read power at a timing corresponding to the waveform of the recording signal 3 supplied from the logical circuit 5, and supplies it to the adder 7 as a pulse current.

The direct current from the bias current drive circuit 10 and the pulse current from the pulse current drive circuit 6 are added by the adder 7, and supplied to the laser diode 8 of the optical head 9.

Next will be described specific operations of the recording apparatus according to the present invention with reference to FIGS. 3 and 4.

Figure 3:
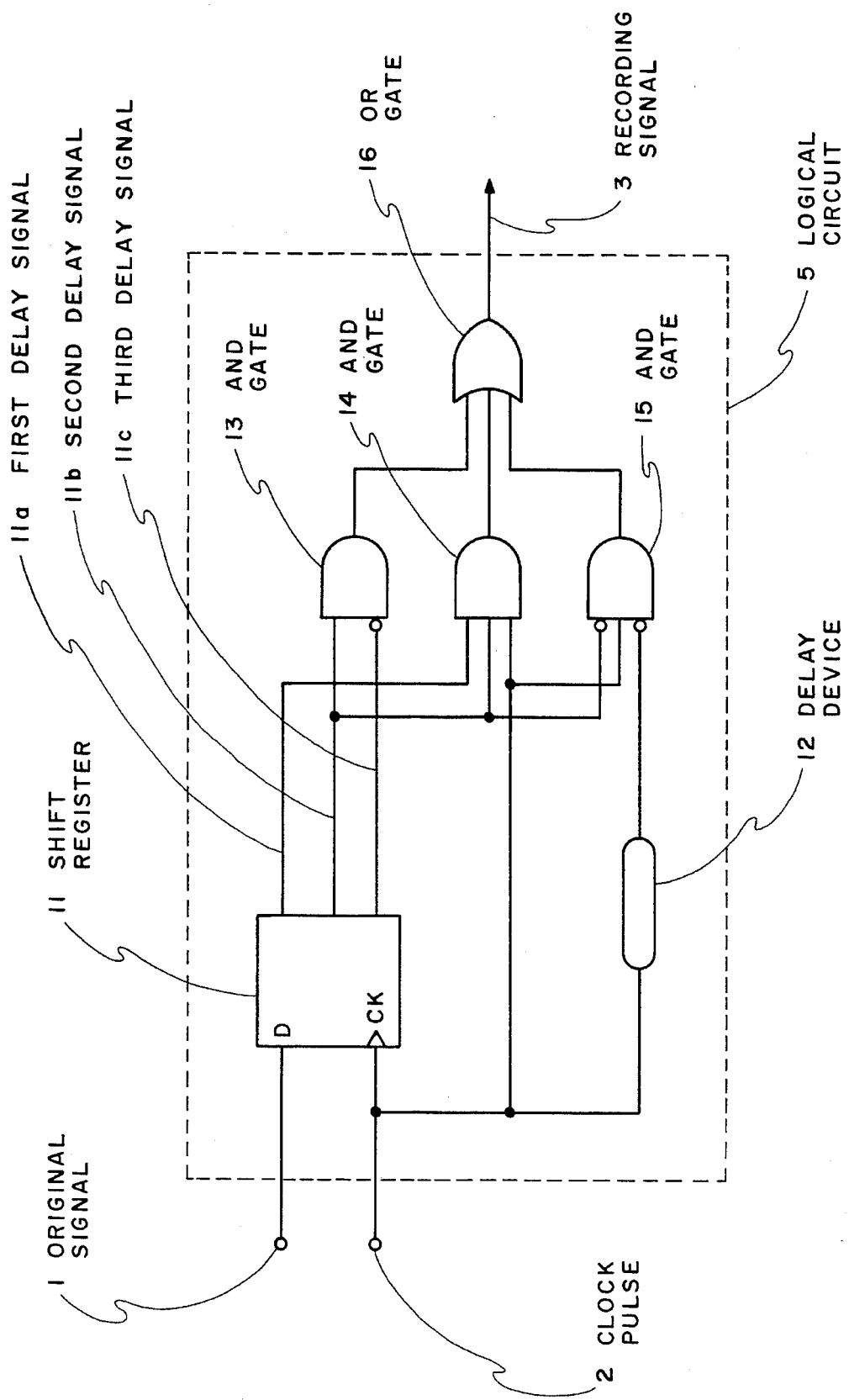
FIG. 3 is a configurative diagram illustrating an example of the logical circuit 5 in the embodiment of FIG. 2.
Figure 4:
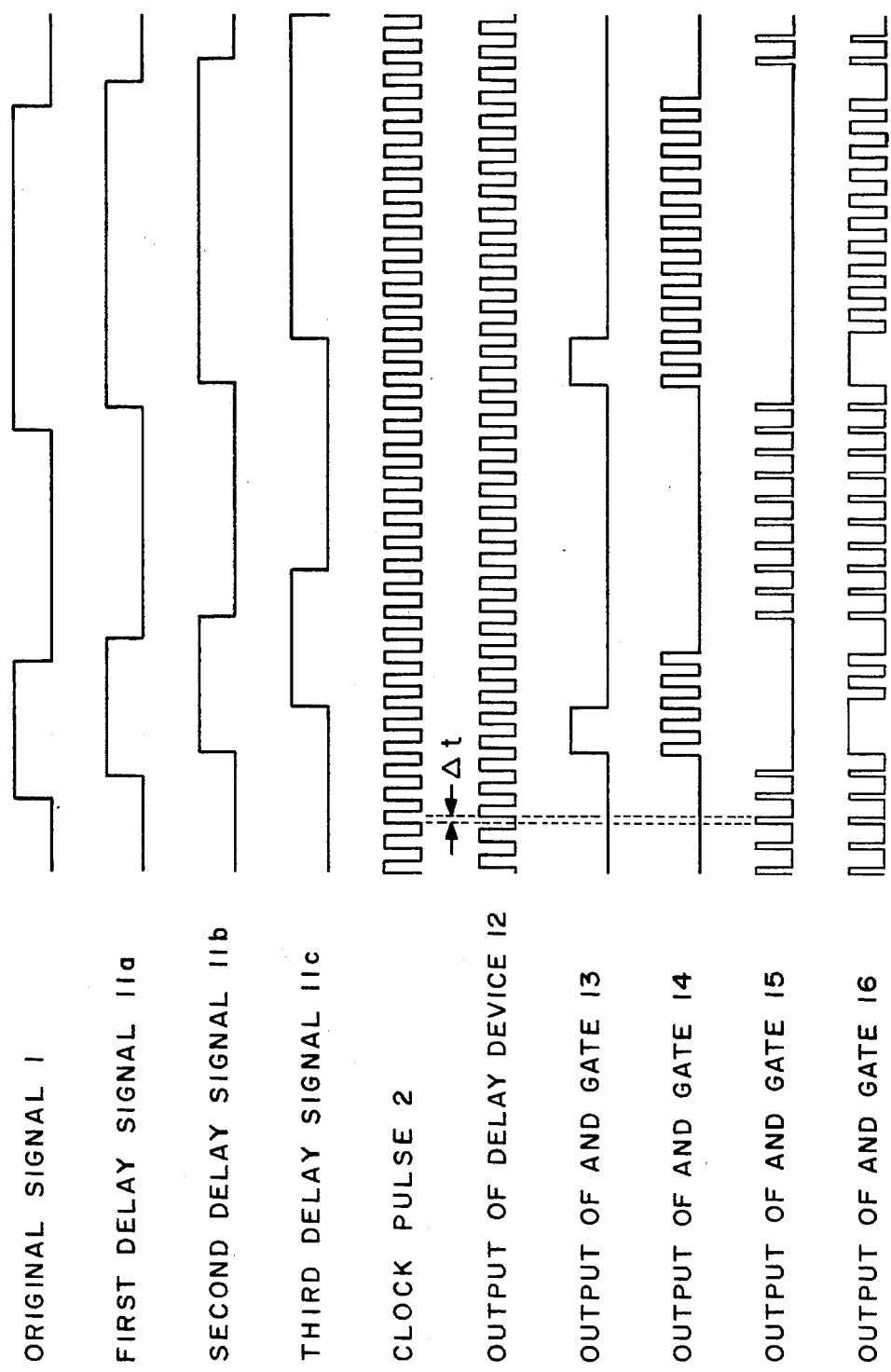
FIG. 4 is a timing chart illustrating the operation of the logical circuit 5 of FIG. 3.
Figure 5:
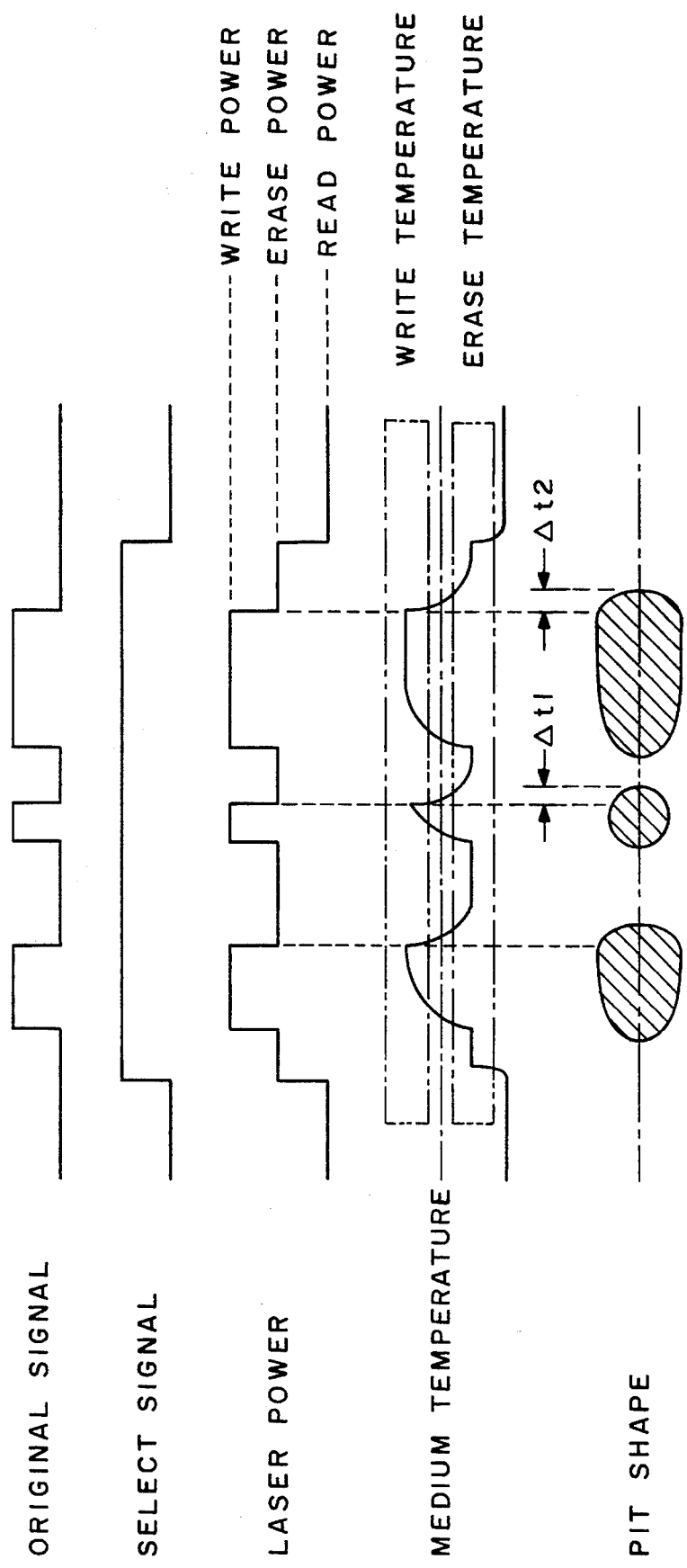
FIG. 5 is an illustrative diagram of the operation of and problems in an optical recording apparatus according to the prior art.

As illustrated in FIGS. 3 and 4, the original signal 1 is supplied to a shift register 11, and successively delayed correspondingly to the timing of the clock pulse signal.

Here, three appropriate signals are selected out of the delay signals supplied from the shift register 11, and defined to be a first delay signal 11a, a second delay signal 11b and a third delay signal 11c in the ascending order of the delay quantity.

An AND gate 13, upon receiving the inverted signals of the second delay signal 11b and the third delay signal 11c supplied from the shift register 11, generates a pulse signal corresponding to area A, in which the medium temperature is to be steeply raised from the erase to the write temperature.

An AND gate 14, upon receiving the first delay signal 11a, the second delay signal 11b and the clock pulse signal 2, supplied from the shift register 11, generates a pulse signal corresponding to area B in which the write temperature is to be kept constant.

A delay device 12 here performs the role of providing an output which has an equal period to the clock pulse signal 2 and is shorter in the duration of high level state by delaying the clock pulse signal by $\Delta t$.

An AND gate 15, upon receiving the inverted signal of the output from the delay device 12, the clock pulse signal 2 and the inverted signal of the second delay signal 11b, supplied from the shift register 11, generates a pulse signal corresponding to area D in which the erase temperature is to be kept constant. The pulse width of this pulse signal here corresponds to the time $\Delta t$ during which the clock pulse signal 2 is in the high level state on the basis of the period of the clock pulse signal 2.

An OR gate 16, upon receiving the outputs of the AND gates 13, 14 and 15, generates the recording signal 3 representing the timing of irradiation with the laser beam.

Figure 2:
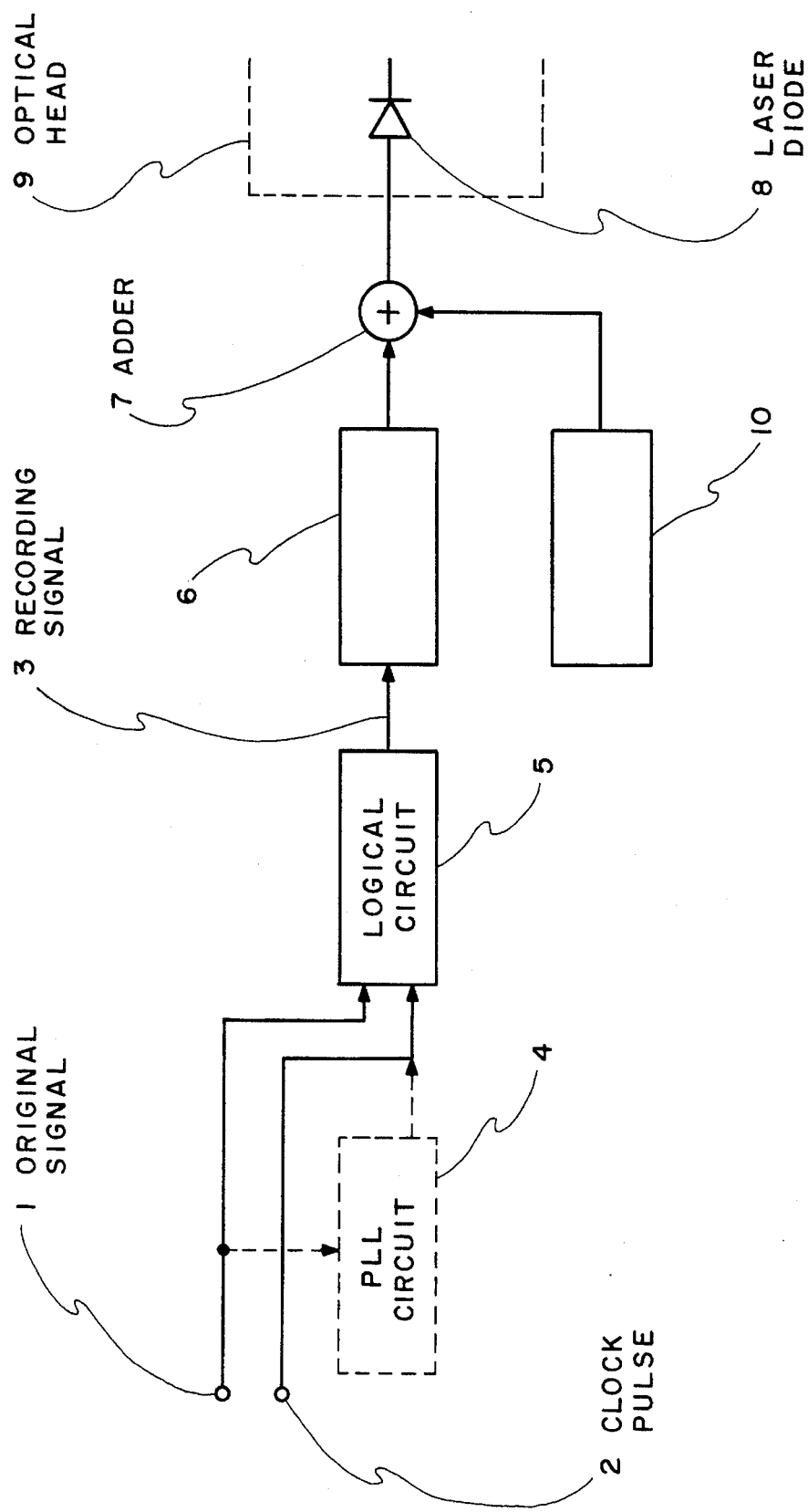
FIG. 2 is a block diagram of an apparatus for recording on optical disk media, which is a preferred embodiment of the invention.

This recording signal 3 is supplied to the pulse current drive circuit 6 shown in FIG. 2, and converted into a pulse current corresponding to a voltage.

The adder adds the pulse current supplied from the pulse current drive circuit 6 and the direct current, corresponding to the laser irradiation power at the time of reading, supplied from the bias current drive circuit 10, and supplies its output to the laser diode 8 of the optical head 9.

The luminous energy of the laser beam emitted from the optical head correspondingly to the current resulting from the addition by the adder 7 is varied by alternately switching in a pulse manner, as the recording signal 3 shown in FIG. 1 is, between the same irradiation power as at the time of reading (the laser irradiation power is set at a low level at the time of reading because a pit would be recorded or erased if the medium temperature rose beyond a certain level) and the laser irradiation power for raising the medium temperature.

Thus, the laser irradiation at the high level functions to raise the medium temperature, while that at the low level serves to reduce the medium temperature (to a level below the write or erase temperature but above the room temperature) and, by laser irradiation corresponding to the recording signal 3 shown in FIG. 1, the medium temperature in the recording part is binarized by the heat conduction of the medium.

When overwrite recording is accomplished here, a binary value (the datum corresponding to either 0 or 1) has to be recorded because the writing takes place without going through the process of erasion, and data "1" and "0" are defined as representing write and erase, respectively, for the sake of convenience though no concept of erasion is involved.

In this case, when the medium temperature of the recording has been raised by laser irradiation and then lowered (when the medium has returned to the room temperature, the writing (corresponding to datum "1") and erasion corresponding to datum "0") take place.

The difference between write and erase in this case derives from the difference in the raised medium temperature resulting from the laser irradiation.

sometimes, the higher temperature (write temperature) extends by heat conduction to form a pit slightly greater than the temperature variation over time, and this recorded pit becomes equal to the pulse of the original signal 1.

Therefore, by dividing the process of laser irradiation into an area in which the medium temperature is to be varied from the erase temperature to the write temperature, an area in which the write temperature is to be kept constant, an area in which the medium temperature is to be varied from the write temperature to the erase temperature, and an area in which the erase temperature is to be kept constant according to the recording signal generated by the logical circuit from the original signal and the bit clock synchronized with the original signal and having a frequency equal to the integral multiple, and by performing laser irradiation correspondingly to each area, the optimal shapes of pits can be formed on the recording face of the optical disk medium resulting in improvements in CNR and in jitter characteristic at the time of reading.

While the present invention has been described with reference to the specific preferred embodiments thereof, it will now be readily possible for those skilled in the art to put this invention into practice in various other manners.

What is claimed is:

1. An information recording method for recording data having two logic levels on a medium selected from a group consisting of a magneto-optical type recording medium and a phase transition type optical recording medium, said method comprising the steps of:

dividing an interval of one of said two levels into a first period, a second period, and a third period, said first period being a starting portion of one of said two levels, said second period following said first period and said third period following said second period;

generating a first DC signal as a recording signal to said medium at said first period;

generating a first pulse train of a predetermined frequency as said recording signal at said second period, said predetermined frequency being not less than a frequency of said two level data, said first pulse train being synchronized with said two level data, and a peak level of said first pulse train coinciding with a level of said first DC signal;

generating a second DC signal as said recording signal at said third period, a level of said second DC signal coinciding with a bottom level of said first pulse train;

generating a second pulse train as said recording signal when said data is the other of said two levels, a frequency of said second pulse train being said predetermined frequency, a pulse width of said second pulse train being narrower than a width of said first pulse train, a peak level of said second pulse train coinciding with said peak level of said first pulse train, and a bottom level of said second pulse train coinciding with said bottom level of said first pulse train; and driving a laser diode to perform a laser irradiation of said medium in response to said recording signal.

2. A method as claimed in claim 1, wherein said predetermined frequency is an integral multiple of a clock signal frequency of said data.

3. An information-recording apparatus for recording data having two logic levels on a medium selected from a group consisting of a magneto-optical type recording medium and a phase-transition type optical recording medium, said apparatus comprising:

dividing means for dividing an interval of one of said two levels into a first period, a second period, and a third period, said first period being a starting portion of one of said two levels, said second period following said first period and said third period following said second period;

first generating means for generating a first DC signal as a recording signal to said medium at said first period;

second generating means for generating a first pulse train of a predetermined frequency as said recording signal at said second period, said predetermined frequency being not less than a frequency of said data, said first pulse train being synchronized with said data, and a peak level of said first pulse train coinciding with a level of said first DC signal;

third generating means for generating a second DC signal as said recording signal at said third period, a level of said second DC signal coinciding with a bottom level of said first pulse train;

fourth generating means for generating a second pulse train as said recording signal when said data is the other of said two levels, a frequency of said second pulse train being said predetermined frequency, a pulse width of said second pulse train being narrower than a width of said first pulse train, a peak level of said second pulse train coinciding with said peak level of said first pulse train, and a bottom level of said second pulse train coinciding with said bottom level of said first pulse train; and means for driving a laser diode for irradiating said medium in response to said recording signal.

4. An apparatus as claimed in claim 3, wherein said predetermined frequency is an integral multiple of a clock signal frequency of said data.

\* \* \* \* \*

UNITED STATES PATENT AND TRADEMARK OFFICE
CERTIFICATE OF CORRECTION

PATENT NO. : 5,469,422
DATED : November 21, 1995
INVENTOR(S) : Mitoshi Sohmuta

It is certified that error appears in the above-indentified patent and that said Letters Patent is hereby corrected as shown below:

On the title page, item [22]:
    The filing date should be —-Filed: Jan. 18, 1994— rather than "Filed: Jan. 19, 1994"

Signed and Sealed this

Fifth Day of November, 1996

*Attest:*

BRUCE LEHMAN

*Attesting Officer*    Commissioner of Patents and Trademarks